United States Patent [19]

Wachter

[11] 4,346,067
[45] Aug. 24, 1982

[54] METHOD OF ION EXCHANGE ZEOLITES

[75] Inventor: William A. Wachter, Baton Rouge, La.

[73] Assignee: Exxon Research & Engineering Co., Florham Park, N.J.

[21] Appl. No.: 278,163

[22] Filed: Jun. 29, 1981

[51] Int. Cl.³ .................. C01B 33/20; C01B 33/28
[52] U.S. Cl. .................... 423/326; 252/455 Z; 423/328
[58] Field of Search ............... 423/326–328, 423/332; 252/455 Z

[56] References Cited

U.S. PATENT DOCUMENTS 3,374,057  3/1968  McDaniel et al. .............. 423/328
3,383,169  5/1968  Young ........................... 423/328
3,402,996  9/1968  Maher et al. ................... 423/328
3,875,290  4/1975  Gring ............................ 423/328
3,929,672 12/1975  Ward ........................... 252/455 Z
3,948,760  4/1976  Gring ............................ 208/111

Primary Examiner—Edward J. Meros
Attorney, Agent, or Firm—Marthe L. Gibbons

[57] ABSTRACT

An improved ion exchange method is provided in which an alkali metal cation-containing crystalline metallosilicate zeolite is contacted with an ion exchange medium comprising an ammonium ion, urea and water. The resulting mixture is heated to a temperature sufficient to evaporate the water and solidify the remaining mixture. An ammonium exchanged zeolite having a decreased content of alkali metal is recovered.

11 Claims, No Drawings

METHOD OF ION EXCHANGE ZEOLITES

BACKGROUND OF THE INVENTION

1. Field of the Invention

The present invention relates to an improved method of ion exchanging a crystalline zeolite.

2. Description of the Prior Art

It is well known to exchange a cation of a crystalline zeolite with another cation by aqueous or non-aqueous methods.

U.S. Pat. Nos. 3,875,290 and 3,948,760 disclose ion exchanging a crystalline aluminosilicate zeolite with an ammonium ion to produce a partially exchanged ammonium aluminosilicate zeolite and subsequently contacting the partially ammonium exchanged aluminosilicate zeolite with a nitrogen compound, which may be urea, and a water soluble salt of a polyvalent metal such as Al, Zr, or Cr to produce, after calcination, a hydrogen and metal exchanged crystalline aluminosilicate which is suitable for use as catalyst in catalytic hydrocarbon conversion processes.

It has now been found that an ion exchange medium comprising an ammonium ion and urea can be used to advantage in ion exchanging an alkali metal metallosilicate zeolite.

SUMMARY OF THE INVENTION

In accordance with the invention there is provided, a method of cation exchanging an alkali metal cation-containing crystalline metallosilicate zeolite which comprises the steps of: (a) contacting said zeolite with an ion exchange medium comprising an ammonium ion, urea, and water; (b) heating the resulting mixture to a temperature and for a time sufficient to evaporate said water and to solidify the remaining mixture, and (c) recovering an ammonium exchanged crystalline metallosilicate zeolite having a decreased content of alkali metal cation.

DESCRIPTION OF THE PREFERRED EMBODIMENT

Suitable zeolites which can be ion exchanged in accordance with the method of the present invention are any of the naturally occurring or synthetic crystalline zeolites which have at least an alkali metal cation. Examples of these zeolites include the zeolites designated by the Linde Division of Union Carbide by the letter X, Y, A, L, (these zeolites are described in U.S. Pat. Nos. 2,882,244; 3,130,007; 3,882,243 and Belgium Pat. No. 5,751,117, respectively); naturally occurring crystalline zeolite such as faujasite, chabazite, erionite, mordenite, offretite, gmelinite, analcite, etc., ZSM-type zeolites, such as ZSM-5 described in U.S. Pat. No. 3,702,886; ferrosilicate zeolites such as those described in U.S. Pat. No. 4,238,318; borosilicate zeolites such as those described in Belgian Pat. No. 859,656.

In general, the chemical formula of anhydrous crystalline metallosilicate zeolites expressed in terms of moles may be represented as follows: $0.9 \pm 0.2 \, M_{2/n}O : W_2O_3 : Z \, SiO_2$, wherein M is selected from the group consisting of hydrogen, monovalent, divalent and trivalent metal cations and mixtures thereof, n is the valence of the cation and Z is a number of at least 2, preferably at least 3, said value being dependent upon the particular type of zeolite. W, a metal in the anionic framework structure of the zeolite, may be aluminum, gallium, boron, iron, etc. Preferably, W is aluminum and the zeolite is a crystalline aluminosilicate zeolite. The zeolites as produced or found in nature normally contain an alkali metal cation such as sodium and/or potassium and/or an alkaline earth metal cation such as calcium and magnesium. The zeolites differ from each other in structure, composition and ratio of silica to metal oxide contained in the crystal lattice structure. The zeolites have uniform pore diameters ranging from about 3 to about 15 angstroms. For use as hydrocarbon conversion catalyst component, it is usually necessary to decrease the alkali metal content of the crystalline metallosilicate zeolite to a content of less than about 10 weight percent, preferably less than about 6 weight percent, more preferably less than about 1 weight percent. The alkali metal content reduction, according to the prior art, is conducted by exchange with one or more cation selected from Groups IB through VIII metals of the Periodic Table of Elements, (The Periodic Table referred to herein is given in the *Handbook of Chemistry and Physics,* published by Chemical Rubber Publishing Company, Cleveland, Ohio, 45th Edition, 1964), as well as hydrogen cation or hydrogen precursor (i.e. $NH_4+$) capable of conversion to hydrogen cation. As starting material for the ion exchange method of the present invention, an alkali metal cation-containing zeolite of any of the above described zeolites, preferably a sodium aluminosilicate zeolite, is contacted with an ion exchange medium comprising an ammonium ion, urea and water. The ammonium ion may be derived from an ammonium salt such as chlorides, nitrates, sulfates. Urea is present in the ion exchange medium in a concentration of weight ratio of urea to ammonium ion ($NH_4+$) ranging from 0.1:1 to 10:1, preferably from 0.5:1 to 1:1. Preferably, the urea is present in an amount sufficient to provide a weight ratio of urea to zeolite being treated above about 1.1 to 1. The alkali metal-containing zeolite starting material is contacted with the ion exchange medium for a time sufficient to decrease the alkali metal content to a desired value. If desired, the ion exchange medium may additionally comprise a metal cation from Groups IB to VIII of the Periodic Table of Elements and mixtures thereof. The resulting mixture is then heated to a temperature and for a time sufficient to evaporate the water and solidify the remaining mixture. Suitable temperatures to evaporate the water and solidify the remaining components are generally above 132° C., preferably at least about 200° C. For example, when a temperature of about 200° C. is utilized, it may be necessary to heat the mixture for about 4 hours to both evaporate the water and solidify the remaining components. At a temperature above about 200° C., the evaporation and solidification may be achieved in less time. The contacting is performed for a time sufficient to decrease the alkali metal content of the zeolite. If desired, the contacting and heating steps may be conducted as a series of successive contacting and heating steps.

The resulting ammonium exchanged zeolite is recovered. The recovered zeolite may be washed with water to remove soluble salts. The recovered ammonium exchanged zeolite, if desired, may be contacted with a fluid medium comprising a non-alkali metal cation of Groups IB through VIII of the Periodic Table of Elements to further exchange the zeolite with a cation of a desired metal. The ammonium exchanged zeolite with or without additional metal cations is generally calcined prior to use as catalyst component or catalyst to decompose the ammonium ion by evolving ammonia and producing the hydrogen form of the zeolite (that is, zeolites having hydrogen cations). The calcination may be performed at a temperature ranging from about 200° C. to about 600° C., dry or in the presence of steam, as is well known in the art. The following examples are presented to illustrate the invention.

EXAMPLE 1

A sodium Y type zeolite (NaY) having 9.18 weight percent sodium, calculated as sodium oxide, based on the zeolite, was used as starting material. Fifty grams of said NaY zeolite were added to each of six jars, designated herein, Jars A to F. The contents of each of these jars are given in Table I.

TABLE I

| | | | JARS | | |
|---|---|---|---|---|---|
| A | B | C | D | E | F |
| 50g NaY | 50g NaY | 50g NaY | 50g NaY | 50g NaY | 50g NaY |
| 20.0g Urea | — | 20g Urea | 40g Urea | — | 20g Urea |
| | 64g $NH_4Cl$ | — | 64 $NH_4Cl$ | — | 64 $NH_4Cl$ |
| | 20g $H_2O$ | 20g $H_2O$ | 20g $H_2O$ | 20g $H_2O$ | 24.4g $AlCl_3.6H_2O$ |

Each of the above jars was heated at 200° C. for 4 hours until the water, if present, evaporated. Jars D and F are in accordance with the method of the present invention. Jars A, B, C and E are not in accordance with the method of the present invention. The zeolites were cooled and washed with 5×250 cc of deionized water to remove soluble salts. The zeolites were then calcined at 500° C. for 1 hour. The results of these experiments are summarized in Table II.

TABLE II

| | A | B | C | D | E | F |
|---|---|---|---|---|---|---|
| S.A.[1] BET, $m^2/g$ | 706.2 | 748.6 | 725.5 | 716.8 | 713.5 | 624.9 |
| P.V.[2] BET, cc/g | 0.49 | 0.38 | 0.40 | 0.32 | 0.38 | 0.35 |
| Na (wt. %)[3] | 7.40 | 2.66 | 8.57 | 1.47 | 9.14 | 1.95 |
| Crystallinity, %[4] | 227.0 | 238 | 308 | 231 | 277 | 193 |

[1]Surface area by the method of BET. (Brunauer, Emmett and Teller, J. American Chem. Soc., Vol. 60 (1938) pp. 309-319).
[2]Pore volume by the method of BET.
[3]Na calculated as sodium based on the zeolite.
[4]Crystallinity by the method of X-ray diffraction.

As can be seen from the data of Table II, jars D and F, which contained zeolite and exchange medium and were treated in accordance with the present invention, gave a greater decrease of sodium than the method in which urea alone is used or the method in which ammonium alone is used.

EXAMPLE 2

The same NaY type zeolite having 9.18 weight percent sodium, calculated as sodium oxide, based on the zeolite, that had been used in Example 1 was used in another series of experiments. Fifty grams of said NaY zeolite were added to each of 6 jars, designated herein jars G, H, I, J, K, L. The contents of the jars are shown in Table III.

Jars G and H were heated at 200° C. for 6.5 hours. Jars I, J, K and L were each heated at 200° C. for 2 hours. The contents of Jars J and K after 2 hours at 200° C. had not solidified. Therefore, Jars J and K are not in accordance with the method of the present invention. Jars G, H, I and L had solidified at the given times and temperatures, and are, therefore, in accordance with the method of the present invention. The zeolites were cooled and washed with 5.68 grams of hot deionized water per gram of zeolite to remove soluble salts. The zeolites were calcined at 600° C. for 1 hours. The results of these experiments are summarized in Table III.

The numbers given as ion exchange medium components are grams per gram of dry NaY zeolite.

TABLE III

| | Jars | | | | | |
|---|---|---|---|---|---|---|
| | G | H | I | J | K | L |
| $NH_4Cl$ | 1.73 | — | — | 1.73 | — | — |
| $(NH_4)_2SO_4$ | — | 2.16 | — | — | 2.16 | — |
| $(NH_4)_2HPO_4$ | — | — | 2.16 | — | — | 2.16 |
| $H_2O$ | 1.43 | 1.43 | 1.43 | 1.43 | 1.43 | 1.43 |
| Urea | 2.16 | 2.16 | 2.16 | 2.16 | 2.16 | 2.16 |
| Heating conditions | 6.5h, 200° C. | 6.5h, 200° C. | 2h, 200° C. | 2h, 200° C. | 2h, 200° C. | 2h, 200° C. |
| Wash | 5 × 6.8 g hot deionized water | | | | | |
| Calcine | 1h, 600° C. | | | | | |
| Crystallinity, %[1] | 261 | 180 | 232 | 237 | 267 | 317 |
| SA[2], $m^2/g$ | 710 | 704 | 703 | 741 | 737 | 734 |
| PV[3], cc/g | 0.40 | 0.38 | 0.43 | 0.44 | 0.43 | 0.44 |
| Na wt. %[4] | 1.32 | 1.28 | 1.94 | 2.80 | 2.67 | 1.90 |

[1]Crystallinity by X-ray diffraction
[2]Surface area, BET method
[3]Pore volume, BET method
[4]Na calculated as sodium based on the zeolite.

What is claimed is:

1. A method of cation exchanging an alkali metal cation-containing crystalline metallosilicate zeolite which comprises the steps of:
   (a) contacting said zeolite with an ion exchange medium comprising an ammonium ion, urea, and water;
   (b) heating the resulting mixture to a temperature and for a time sufficient to evaporate said water and to solidify the remaining mixture, and
   (c) recovering an ammonium exchanged crystalline metallosilicate zeolite having a decreased content of alkali metal cation.

2. The method of claim 1 wherein said contacting and heating steps are conducted as a series of successive contacting and heating steps.

3. The method of claim 1 wherein said ion exchange medium additionally comprises a non-alkali metal cation selected from the group consisting of metals of Groups IB to VIII of the Periodic Table of Elements and mixtures thereof and wherein the recovered zeolite is an ammonium and metal ion exchanged zeolite.

4. The process of claim 1 wherein said urea is present in said ion exchange medium in a weight ratio of urea to ammonium ion ranging from about 0.1:1 to 10:1.

5. The process of claim 1 wherein said ammonium exchanged zeolite is calcined to produce the hydrogen exchanged form of said crystalline metallosilicate zeolite.

6. The method of claim 5 wherein said hydrogen form of zeolite is contacted with an ion exchange medium comprising a non-alkali metal cation of Groups IB through VIII of the Periodic Table of Elements to produce a metal exchanged zeolite.

7. The process of claim 1 wherein said ammonium exchanged zeolite is contacted with an ion exchange medium comprising a non-alkali metal cation selected from Groups IB through VIII of the Periodic Table of Elements and mixtures thereof to at least partially exchange said ammonium exchanged zeolite with said metal cation.

8. The method of claim 6 or claim 7 wherein said metal cation exchanged zeolite is calcined.

9. The method of claim 1 wherein said mixture of step (b) is heated to a temperature of at least about 132° C.

10. The method of claim 1 wherein said mixture of step (b) is heated to a temperature of at least 200° C.

11. The method of claim 1 wherein said recovered ammonium exchanged zeolite is calcined at a temperature ranging from about 200° to about 600° C.

* * * * *